United States Patent [19]
Lee

[11] Patent Number: 5,568,334
[45] Date of Patent: Oct. 22, 1996

[54] HEAD DRUM GROUNDING SYSTEM FOR USE IN A VIDEO CASSETTE RECORDER

[75] Inventor: Hyun-Moo Lee, Incheon, Rep. of Korea

[73] Assignee: Daewoo Electronics Co., Ltd., Seoul, Rep. of Korea

[21] Appl. No.: 386,512

[22] Filed: Feb. 8, 1995

[30] Foreign Application Priority Data

Feb. 8, 1994 [KR] Rep. of Korea ............ 94-2448

[51] Int. Cl.⁶ .................................................. G11B 5/52
[52] U.S. Cl. ................................................. 360/107
[58] Field of Search ............................. 360/107, 84–85

[56] References Cited

U.S. PATENT DOCUMENTS 5,442,506  8/1995  Kang .................................. 360/107

Primary Examiner—A. J. Heinz
Attorney, Agent, or Firm—Anderson, Kill, Olick, P.C.

[57] ABSTRACT

A head drum grounding system for use with a VCR comprises a spring member coupled to a deck of VCR, and a brush being in contact with the rotary drum. The spring member includes an aperture which is surrounded by a flange. The brush is tightly fitted into the aperture. Accordingly, the spring member and the brush are assembled without an adhesive.

3 Claims, 1 Drawing Sheet

HEAD DRUM GROUNDING SYSTEM FOR USE IN A VIDEO CASSETTE RECORDER

FIELD OF THE INVENTION

The present Invention relates to a grounding system for use in a video cassette recorder; and, more particularly, to an improved grounding system for removing static electricity generated from a rotational drum in the recorder.

Description of the Prior Art

As is well known, a video cassette recorder having a head drum assembly which comprises a rotary drum and a stationary drum is normally equipped with a grounding system for removing static electricity from the rotary drum as the static electricity generated between the rotating drum and a magnetic tape may create noises to a signal to be reproduced or recorded.

Referring to FIG. 1, there is illustrated a prior art grounding system 10. As shown, the grounding system 10 is provided with a bracket 12 mounted on a deck; a leaf spring 14 secured to the bracket 12; and a brush 16 depressed against a rotating shaft 18 of a head drum assembly by the leaf spring 14. The leaf spring 14 and the brush 16 constitute an electrical coupler 13. The leaf spring 14 has a hole 15 in which the brush 16 is inserted. Since the leaf spring 14 is normally made of a thin metal, it is difficult to securely attach the brush 16 to the leaf spring 14 by way of a mechanical means. Accordingly, the brush 16 is usually bonded to the leaf spring 14 by a conductive adhesive which needs to be cured by heat treatment. Such adhesion process and heat treatment are cumbersome and time-consuming, however.

SUMMARY OF THE INVENTION

It is, therefore, a primary object of the invention to provide an improved grounding system of a head drum assembly structured to simplify the manufacturing process thereof by way of eliminating the need to employ an adhesive.

The above and other objects of the present invention are accomplished by means of a video cassette recorder incorporating therein a grounding system for discharging static electricity generated from a head drum assembly therein, said head drum assembly including a stationary drum secured to a deck within the video cassette recorder and a rotary drum rotatably coupled to the stationary drum, wherein said grounding system comprises:

a spring member mounted on the deck, the spring member including an aperture which is surrounded by a flange; and a brush inserted into the aperture, the brush being in contact with the rotary drum.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
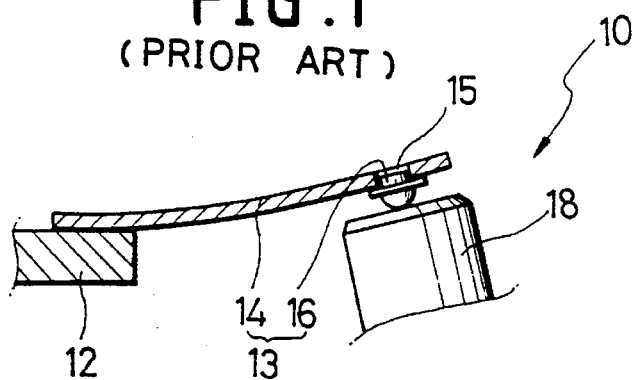
FIG. 1 is an enlarged sectional view of an electrical coupler of a prior art grounding system.
Figure 2:
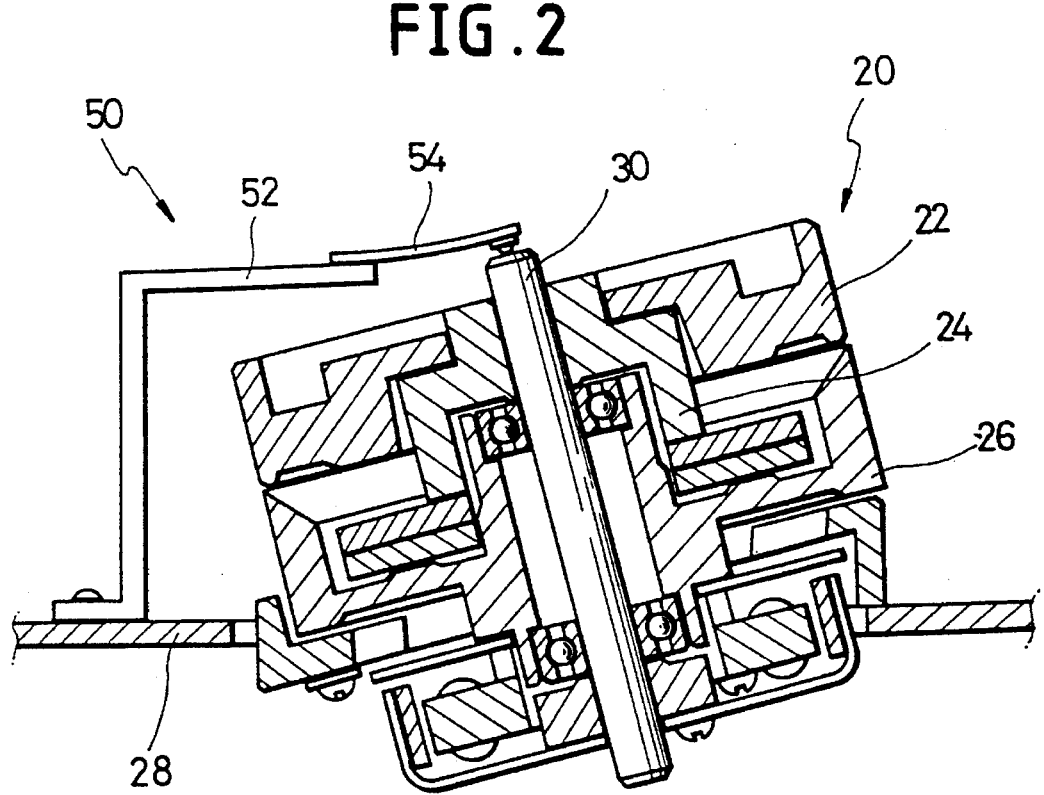
FIG. 2 represents a longitudinal sectional view of a head drum assembly employing a grounding system in accordance with the present invention.

Referring to FIG. 2, there is shown a head drum assembly 20 of a video cassette recorder including a grounding system 50 in accordance with the present invention. As shown, the head drum assembly 20 is provided with a rotary drum 22 supported by a boss member 24, and a stationary drum 26 fixed on a deck 28. A rotating shaft 30 closely fitted into the boss member 24 is rotatably supported by a pair of radial bearings which are located at both ends of the stationary drum 26, respectively. The deck 28 has a bracket. 52 attached thereto; and is electrically connected to ground or a common line of the video cassette recorder.

The grounding system 50 has an electrical coupler 54 secured to the bracket 52. The electric coupler 54 comes in contact with the rotating shaft 30. The static electricity generated from the rotary drum 22 is transmitted to ground through the boss member 24, the rotating shaft 30, the electrical coupler 32, and the deck 28, in that order.

Figure 3:
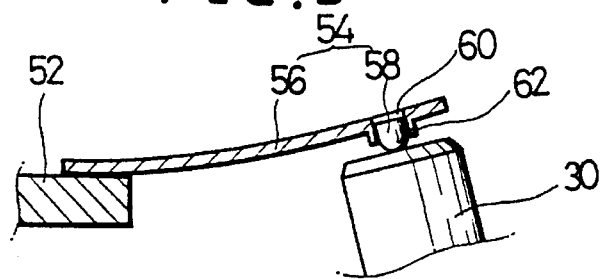
FIG. 3 provides an enlarged sectional view of the electrical coupler shown in FIG. 2.

FIG. 3 illustrates an enlarged sectional view of the electrical coupler 54 shown in FIG. 2. The electric coupler 54 has a spring member 56 and a conductive brush 58. The spring member 56 is made of a thin rigid and conductive material, e.g., brass. The spring member 56 is substantially flat. An end portion of the spring member 56 is secured to the bracket 52 by using, e.g., a bolt. The spring member 56 has an aperture 60 and a cylindrical flange 62 which is integrally formed therewith around the aperture 60 and extends toward the rotating shaft 30. The aperture 60 and the flange 62 are constructed by way of, e.g., drawing.

The brush 58 is made of, e.g., graphite. The brush 58 has a cylindrical body and a hemispherical end. The hemispherical end of the brush 58 comes in a resilient contact with the shaft 30. The body of the brush 58 is tightly inserted into the aperture 60 of the spring member 56 so that it is firmly grasped by the flange 62. This configuration of the spring member 56 and the brush 58 facilitates an easy assembly thereof without using an adhesive.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder incorporating therein a grounding system for discharging static electricity generated from a head drum assembly therein, said head drum assembly including a stationary drum secured to a deck within the video cassette recorder and a rotary drum rotatably coupled to the stationary drum through a rotating shaft, wherein said grounding system comprises:

a spring member mounted on the deck, the spring member including an aperture and a flange which is integrally formed therewith around the aperture and extends toward the rotating shaft; and a brush tightly inserted into the aperture and the flange, the brush being in contact with the rotating shaft.

2. The video cassette recorder as recited in claim 1, wherein said brush is made of a graphite.

3. The video cassette recorder as recited in claim 1, wherein said spring member is made of a brass.

* * * * *